United States Patent
Gordon et al.

(10) Patent No.: US 11,677,268 B2
(45) Date of Patent: Jun. 13, 2023

(54) MEDIA ACCESS CONTROL SECURITY (MACSEC) APPLICATION CRYPTOGRAPHIC FINGERPRINTING

(71) Applicant: Schweitzer Engineering Laboratories, Inc., Pullman, WA (US)

(72) Inventors: Colin Gordon, Katy, TX (US); Sai Krishna Raghupathula, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 352 days.

(21) Appl. No.: 17/008,876

(22) Filed: Sep. 1, 2020

(65) Prior Publication Data

US 2022/0069618 A1    Mar. 3, 2022

(51) Int. Cl.
| | |
|---|---|
| *H02J 13/00* | (2006.01) |
| *H04L 9/40* | (2022.01) |
| *H04L 9/08* | (2006.01) |
| *H04L 12/10* | (2006.01) |
| *H04L 45/745* | (2022.01) |
| *H04L 9/06* | (2006.01) |

(52) U.S. Cl.
CPC .. *H02J 13/00016* (2020.01); *H02J 13/00001* (2020.01); *H02J 13/00028* (2020.01); *H02J 13/00034* (2020.01); *H04L 9/0643* (2013.01); *H04L 9/0819* (2013.01); *H04L 12/10* (2013.01); *H04L 45/745* (2013.01); *H04L 63/0428* (2013.01); *H04L 63/062* (2013.01)

(58) Field of Classification Search
CPC ........... H02J 13/00016; H02J 13/00028; H02J 13/00001; H02J 13/00034; H04L 9/0643; H04L 9/0819; H04L 12/10; H04L 45/745; H04L 63/0428; H04L 63/062
See application file for complete search history.

(56) References Cited

U.S. PATENT DOCUMENTS

| | | | |
|---|---|---|---|
| 7,729,276 B2 | 6/2010 | Akyol | |
| 10,212,138 B1* | 2/2019 | Diamant | H04L 63/0428 |
| 2017/0331669 A1* | 11/2017 | Ganesh | H04L 41/0226 |
| 2019/0116183 A1 | 4/2019 | Hussain | |
| 2019/0173860 A1 | 6/2019 | Sankaran | |
| 2019/0342101 A1 | 11/2019 | Hayes | |
| 2020/0092118 A1* | 3/2020 | Zhuang | H04L 12/10 |
| 2020/0106719 A1* | 4/2020 | Acharya | H04L 63/0485 |

* cited by examiner

*Primary Examiner* — Toan M Le
*Assistant Examiner* — Xiuqin Sun
(74) *Attorney, Agent, or Firm* — Bradley W. Schield; Richard M. Edge (57) ABSTRACT

An intelligent electronic device (IED) includes memory and a processor operatively coupled to the memory. The processor is configured to establish, over a communication network of a power system, a connection association (CA) with a receiving device using a MACsec Key Agreement (MKA). The processor is configured to automatically send an announce message indicating a set of enabled application protocols on the IED to the receiving device.

15 Claims, 8 Drawing Sheets

| IED Network Stack ||||||
|---|---|---|---|---|---|
| SCADA Protocol Suite 202 ||| | IEC 61850 GOOSE 204 ||
| DNP 210 | MMS 212 | Modbus TCP 214 | Telnet 216 | App ID 901 218 | App ID 902 220 |
| PI 10 ||| PI 100 | PI 901 | PI 902 |

| IED Network Stack ||||||
|---|---|---|---|---|---|
| SCADA Protocol Suite 202 ||| | IEC 61850 GOOSE 204 ||
| DNP 210 | MMS 212 | Modbus TCP 214 | Telnet 216 | App ID 901 218 | App ID 902 220 |
| PI 10 | PI 11 | PI 12 | PI 100 | PI 901 | PI 902 |

MEDIA ACCESS CONTROL SECURITY (MACSEC) APPLICATION CRYPTOGRAPHIC FINGERPRINTING

TECHNICAL FIELD

The present disclosure relates generally to ethernet communication, more particularly, to communicating over a wired ethernet using Media Access Control Security (MACsec) and MACsec Key Agreement (MKA).

BRIEF DESCRIPTION OF THE DRAWINGS

Non-limiting and non-exhaustive embodiments of the disclosure are described herein, including various embodiments of the disclosure with reference to the figures listed below.

FIG. 4 is an IED network stack of application protocols communicated by IEDs over the communication network of FIG. 1, in accordance with an embodiment.

FIG. 5 is another IED network stack of application protocols communicated by IEDs over the communication network of FIG. 1, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and trip circuit breakers to disconnect electrical equipment to protect the electric power delivery system from exceeding designed operating conditions due to faults.

IEDs may communicate with each other and other electronic devices to facilitate the monitoring, control, and protection of the power delivery system. For instance, IEDs may be connected to a wired Ethernet network, via a network switch, that receives data from a sending IED and forwards the received data to a destination IED. The IEDs may communicate power system data, such as voltage measurements, current measurements, circuit breaker statuses, and circuit breaker commands, among others, to allow the IEDs to better control and protect the power system.

To communicate, IEDs may send the power system data encapsulated into frames of a data link layer of a network. The data link layer may refer to the layer two of the open systems interconnection (OSI) architecture model. To improve security, IEDs may communicate the power system data according to the 802.1AE Institute of Electrical and Electronics Engineers (IEEE) Media Access Security (MACsec) frame format on the data link layer. Data communicated using MACsec frames may include an encrypted payload as well as additional header information. For example, the MACsec frame may include a Sectag that has an optional secure channel identifier (SCI). Within the SCI, a port identifier is included.

Within communication networks of electric power systems, frames may be sent according to various application protocols, such as distributed network protocol (DNP), manufacturing message specification (MMS), Modbus, Telnet, and generic object oriented substation event (GOOSE). Different application protocols within the frames may include different fields. Further, messages of certain application protocols may be managed differently than other application protocol messages on the communication network of the power system. Accordingly, there is a need to better facilitate communicating frames of different application protocols on communication networks of power systems.

Figure 1:
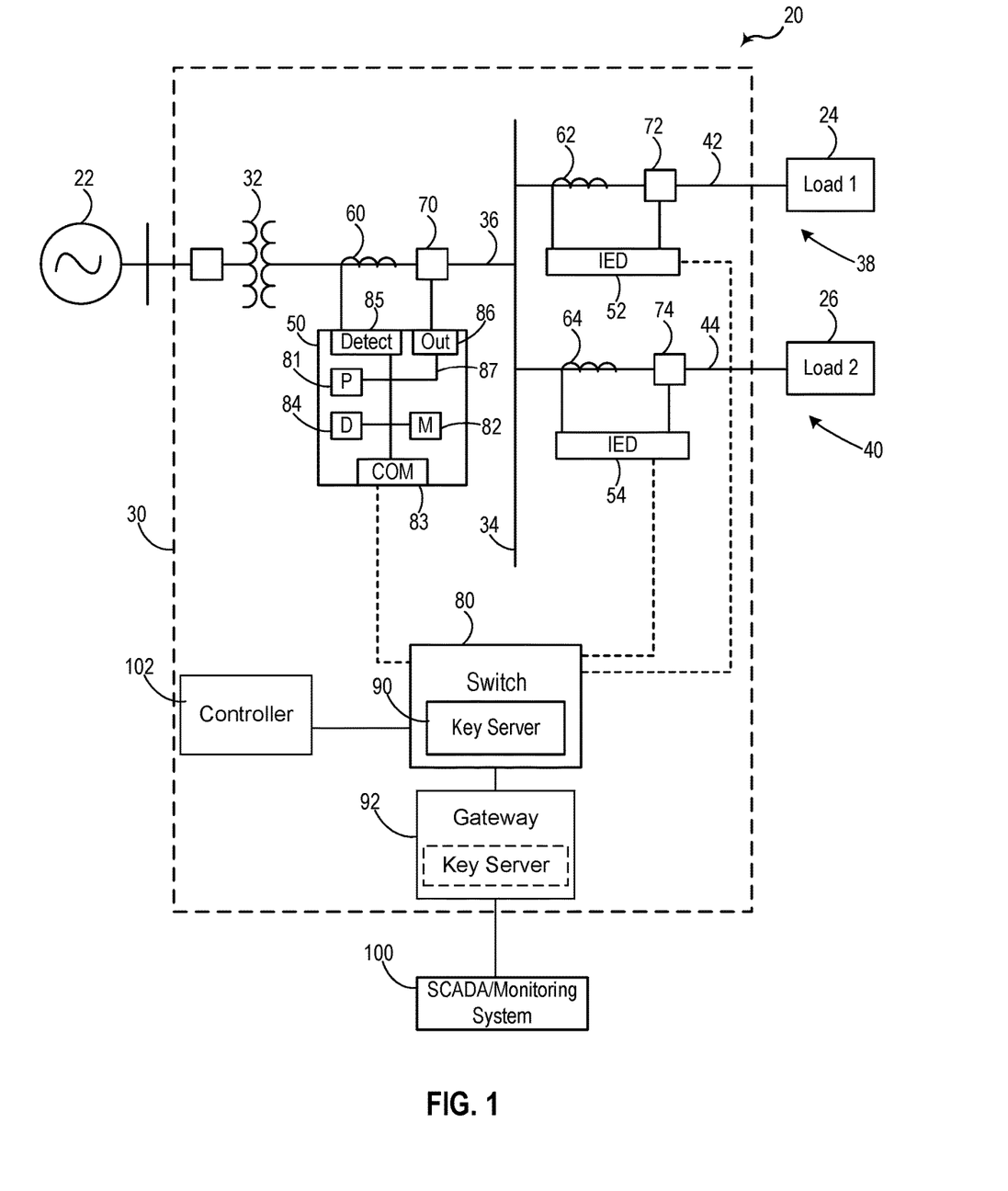
FIG. 1 is a one-line diagram of an electric power delivery system having intelligent electronic devices (IEDs) that communicate over a communication network, in accordance with an embodiment.

FIG. 1 is a one-line diagram of a power system 20 that includes a power source 22, such as a distributed generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 44. Although illustrated in single-line form for purposes of simplicity, power system 20 may be a multi-phase system, such as a three-phase electric power delivery system.

The power system 20 may be monitored by one or more IEDs 50, 52, and 54, although additional IEDs may also be utilized. As used herein, an IED (such as IEDs 50, 52, and 54) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 50, 52, and 54 may obtain electric power system data using current transformers (CTs) 60, 62, and 64, and potential transformers (PTs), and the like. The IEDs 50, 52, and 54 may detect events, such as fault events, on the power lines 36, 42, and 44 using current and voltage signals from the CTs 60, 62, and 64 and/or the PTs. The IEDs 50, 52, and 54 may be communicatively coupled to circuit breakers (CBs) 70, 72, and 74 to send control signals to the CBs 70, 72, and 74 to open (i.e., trip) or close the CBs 70, 72, and 74 based on the power system data.

The IED 50 may further include one or more processors 81, a computer-readable medium (e.g., memory 82), a communication interface 83, a display terminal 84, detection circuitry 85, and output circuitry communicatively coupled to each other via one or more communication buses 87. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IED 50. It should be noted that FIG. 1 is merely one example of a particular implementation and is intended to illustrate the types of components that may be present in the IED 50.

In the IED 50 of FIG. 1, the processor 81 may be operably coupled with the memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM).

In the illustrated embodiment, the IED 50 includes detection circuitry 85 that detects various electrical conditions of the power line 36 based on the input signals. The detection circuitry 85 may include a current conversion circuit (e.g., a transformer) that transform the input signals to levels that may be sampled by the IED 50. The detection circuitry 85 may include analog-to-digital converter(s) that sample the current and voltage signals and produce digital signals representative of measured current and measured voltage on the power line which may be transmitted to the processor 81. The IED 50 may compare the current measurements to thresholds to detect faults and to disconnect the bus 34 from the power source 22. For example, if current on one or more phases exceeds a preset threshold and/or current-over-time exceeds a preset threshold, the processor 81 may detect a fault event and send a signal, via the output circuitry 86, to open the CB 70.

In some embodiments, the IED 50 may include a communication interface 83, such as an ethernet port, to communicate with other IEDs Further, the IED 40 may include a display terminal 86 and input structures (e.g., Universal-Serial-Bus (USB) ports, buttons, touchscreens, etc.) to allow operators to review events on the power line, change settings, etc.

Each of the IEDs 52 and 54 may have similar components (e.g., processor 81, memory 82, communication interface 83, display 84, detection circuitry 85, and output circuitry 86) to those described with respect to IED 50 to allow the IEDs 52 and 54 to obtain power system measurements, control the CBs 72 and 74, and to communicate. In some embodiments, the IEDs 50, 52, and 54 may communicate power system data via a communication network.

In the illustrated embodiment, the IEDs 50, 52, and 54 may be connected to a switch 80 to form a wired network. The switch 80 may receive frames of power system data from a sending IED and forward the power system data to a receiving IED For example, IED 50 may send and/or receive power system data to or from IEDs 52, and 54, such as voltage measurements, current measurements, and circuit breaker status, among others. If IED 52 were to detect a fault, IED 52 may communicate the fault event to IED 50 and the status of CB 72 via the wired network. If the CB 72 opens, the IED 50 may keep CB 70 closed to allow power to continue to be delivered to load 26. If IED 52 detects a fault and CB 72 remains closed, IED 50 may respond by opening CB 70, thereby isolating the fault. The IED 50 may respond to fault events faster due to the communication network, thus improving the reliability of the power system 20.

The switch 80 may include switching hardware and forwarding circuitry, which may include one or more processors, memory, and communication ports that allow the switch 80 to receive and forward power system data to a receiving device. The switch 80 may be embodied as a managed switch or an unmanaged switch.

The switch 80 may operate as a key server 90 that manages MACsec frame communication on the switch 80 via MACsec keys. In other embodiments, the key server 90 may be embodied as a gateway, a remote terminal unit (RTU), or the like. For example, a gateway may be an electronic device that operates as an access control that authorizes access or prevents unauthorized access onto the communication network from remote devices, such as a supervisory control and data acquisition (SCADA) system 100. The key server 90 may operate using hardware of the switch 80 or the gateway 92 or may include separate hardware to communicate MACsec keys. In certain embodiments, a controller 102, such as an SDN controller, may manage the communication network, based on inputs from a user, by sending control instructions to the switch 80. In some embodiments, the key server 90 may be a part of an intrusion detection system (IDS) that prevents intruders on the network by inspecting the messages. In certain embodiments, the controller 102 may also be a key server.

Figure 2:
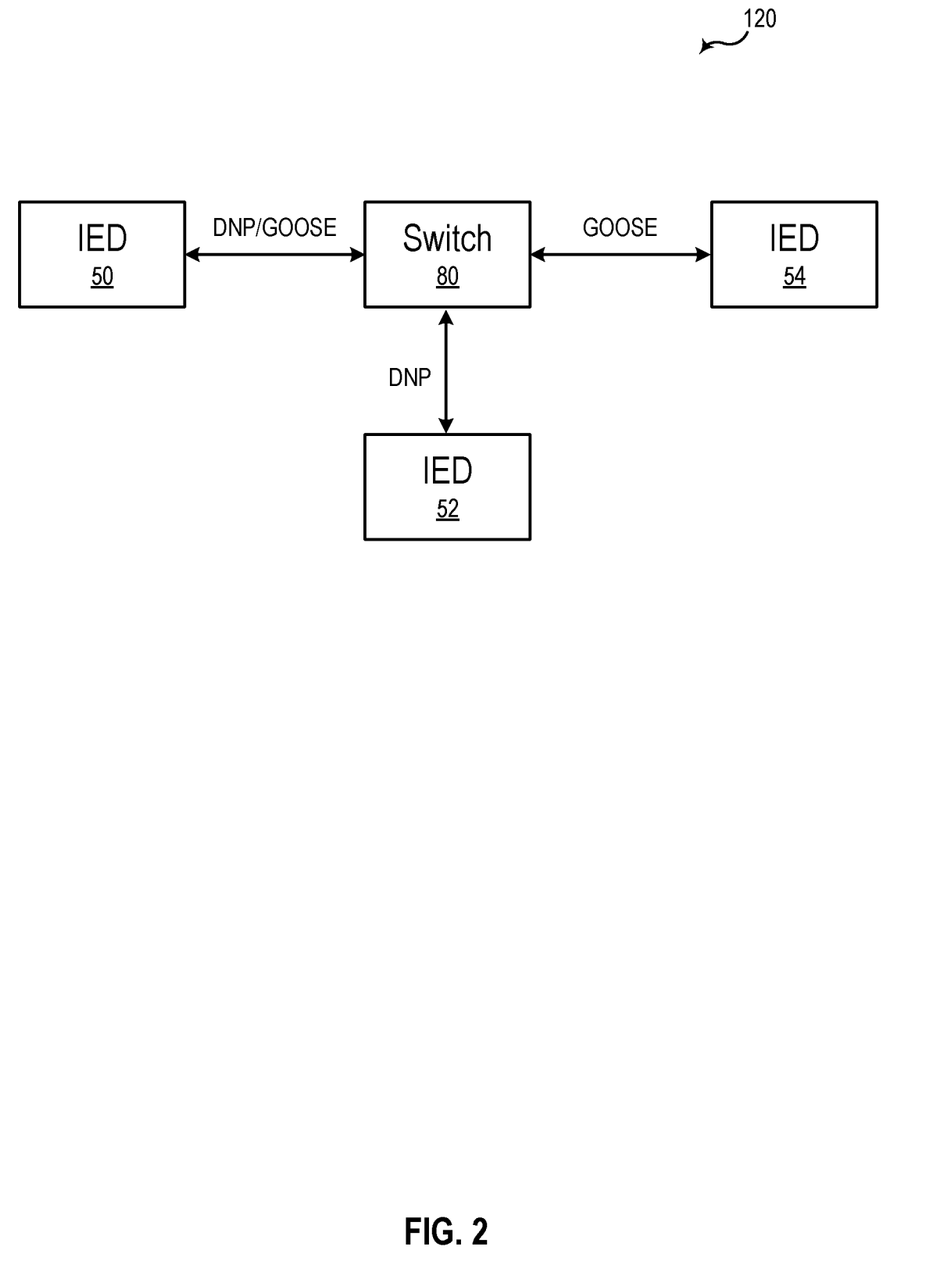
FIG. 2 is a network diagram of the communication network of FIG. 1, in accordance with an embodiment.

FIG. 2 is a block diagram of the communication network 120 of communication through the switch 80. Communication frames of different application protocols may be sent on the communication network 120, which may depend on the device and the configuration. For example, the IED 50 may communicate frames of a DNP application protocol with IED 52 and communicate frames of a GOOSE application protocol with IED 54. Any suitable combination of application protocols may be used depending on the implementation of the power system 20. MACsec frames may be used to communicate power system data between each of the IEDs 50, 52, and 54 on the communication network 120.

Figure 3:
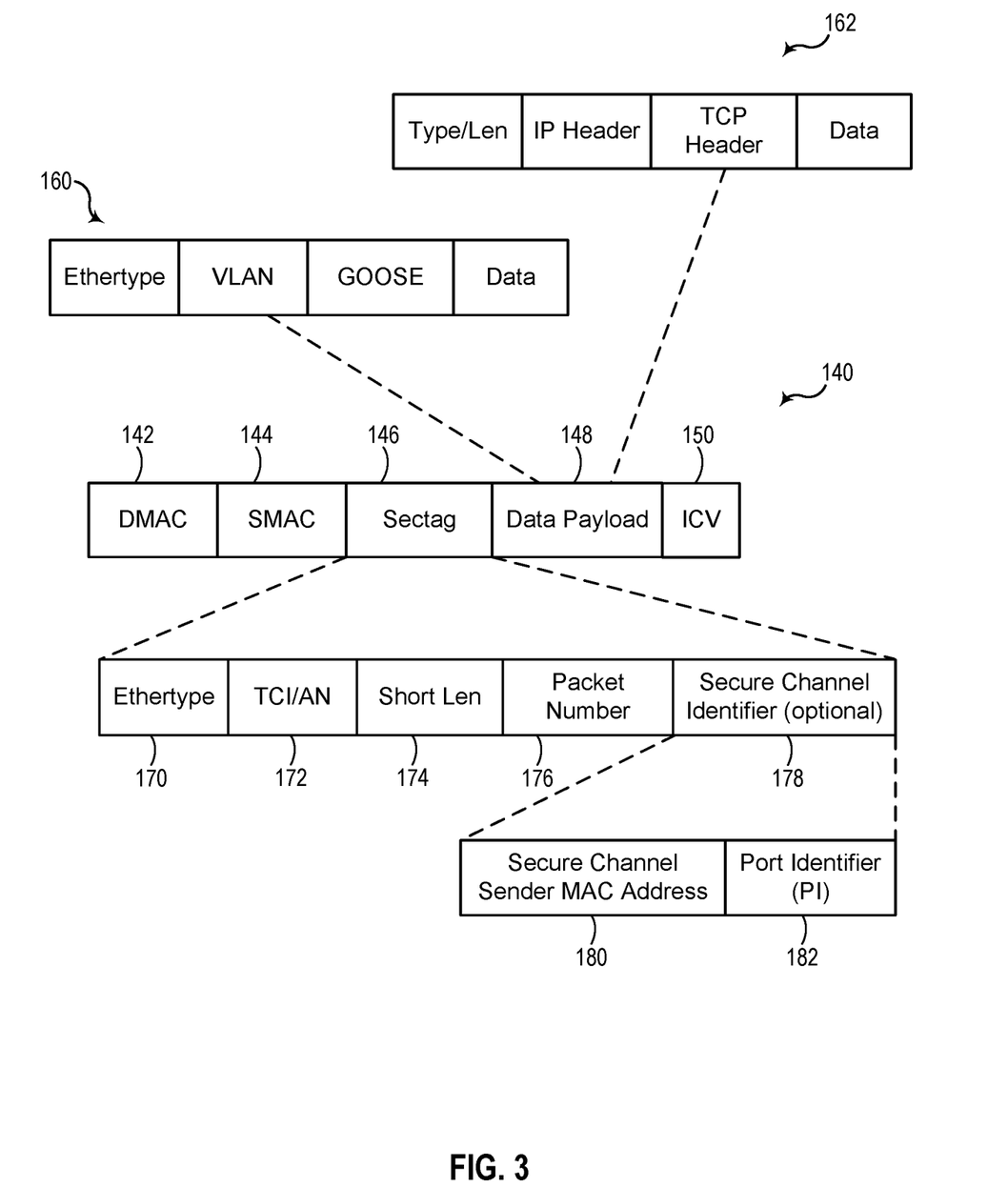
FIG. 3 is a layout of a Media Access Control Security (MACsec) frame that may be communicated on the communication network of FIG. 1, in accordance with an embodiment.

FIG. 3 is a field layout of an embodiment of a MACsec frame 140 that may be used in the communication network 120 of the power system 20. The MACsec frame 140 may include a destination MAC address 142, a source MAC address 144, a security tag (Sectag) 146, an authenticated and (optionally) encrypted payload 148, and an integrity check value (ICV) 150. The MAC address may be a unique number of a network interface controller (NIC) of the device. The MAC address may be stored in firmware or ROM by the manufacture of the device. Some or all of the payload 148 may be encrypted depending on the application protocol of the MACsec frame. For example, MACsec frames communicating GOOSE messages 160 may include a first set of header fields and MACsec frames communicating DNP messages 162 may include a second set of header fields, different from the first set of header fields.

The Sectag 146 may include an Ethertype 170, a TCI/AN, a short len 174, and a packet number 176, which may be used to identify the decryption key and detect transmission of repeated frames. Further, in MACsec frames 140, the Sectag 146 may include a secure channel identifier 178, which is an optional field. The secure channel identifier 178 may include a secure channel sender MAC address 180 and a port identifier (PI) 182. The ICV 150 may ensure the integrity of the MACsec frame 140 by allowing the recipient to detect errors in the transmission process.

FIG. 4 is a diagram of an embodiment of an IED network stack 200 in the communication network 120 In the communication network 120, the IED network stack 200 may include various individual application protocols and/or application protocol suites. For example, the IED network stack 200 may include a supervisory control and data acquisition (SCADA) protocol suite 202 and an IEC 61850 GOOSE protocol suite 204. The SCADA protocol suite 202 may include DNP 210, MMS 212, and Modbus TCP 214 protocols, and the IEC 61850 GOOSE protocol suite 206 may include various Application IDs (e.g., App ID 901 218 and App ID 902 220). Additionally, the IED network stack 200 may include application protocols associated with a PI without being in a protocol suite, such as Telnet 216.

The IEDs 50, 52, and 54 may communicate MACsec frames 140 with a PI 182 associated with one or more of the application protocols of the network stack on the communication network 120 of the power system 20. For example, IED 50 may communicate a MACsec frame 140 with a PI 182 having a value of 10 to indicate that the MACsec frame 140 is one of the application protocols of the SCADA protocol suite 202. Further, this may allow middleboxes (e.g., the switch 80, a gateway, a router, or another IED that routes packets over the communication network 120), or devices that forward data to endpoint hosts, to have awareness of the protocol at layer two without decrypting the encrypted payload 148.

FIG. 5 is another diagram of an embodiment of an IED network stack 200 with a different configuration of PIs. As illustrated, each application protocol may be associated with a different PI. For example, DNP is associated with PI 10, MMS is associated with PI 11, Modbus TCP is associated with PI 12, Telnet is associated with PI 100, GOOSE App ID 901 is associated with PI 901, and App ID 902 is associated with PI 902. The IEDs 50, 52, and 54 may each include a look-up table of PIs and the associated protocol(s). Upon receiving a MACsec frame, the IEDs 50, 52, and 54 and the switch 80 may identify the application protocol of the frame using the PI. Further, the IEDs 50, 52, and 54 may inspect the frame according to the associated application protocol. Further, by identifying the application protocol in the PI 182 of the MACsec frame 140, the IEDs 50, 52, and 54, characteristics of the MACsec frame may be determined without decrypting the encrypted payload 148.

Figure 6:
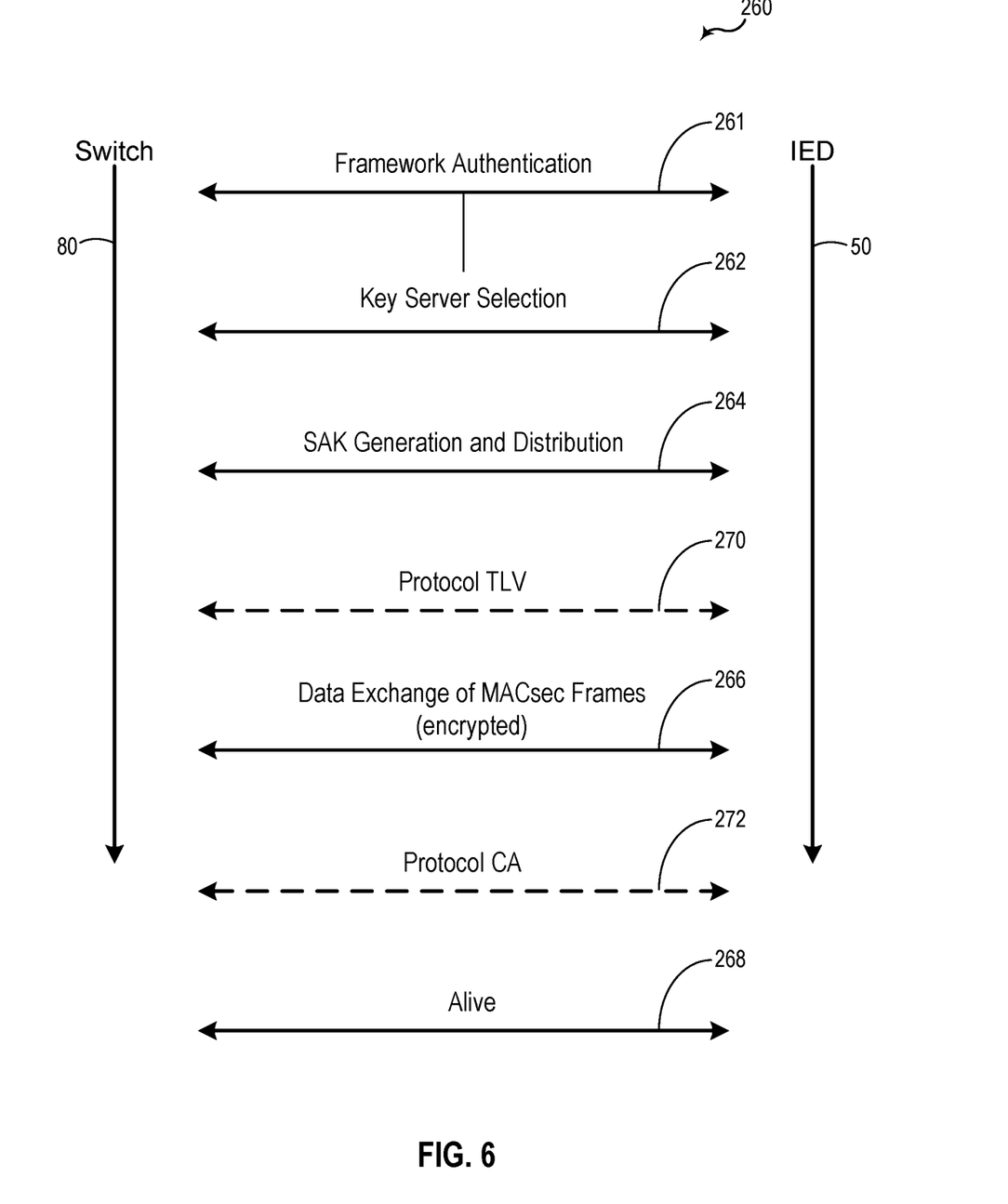
FIG. 6 is a timing diagram of an MACsec Key Agreement (MKA) process used to communicate MACsec frames between IEDs over the communication network of FIG. 1, in accordance with an embodiment.

FIG. 6 is a timing diagram of a MACsec key agreement protocol (MKA) performed between a key server, such as the switch 80 or another IED, and an IED 50 to establish a connectivity association (CA) that connects peer-to-peer devices in the communication network 120. Before MKA begins, framework authentication may occur in which each of the devices authenticate the other (arrow 261). For example, secure pre-shared key (PSK) authentication may be used in which each device uses shared keys to ensure that the devices are in fact allowed on the communication network 120. As another example, a master session key (MSK) may be obtained from an extensible authentication protocol (EAP) session. The MSK may then be used to determine a connectivity association key (CAK) for the MKA process. In another case, a user-entered passcode may be used to derive a CAK.

Following the framework authentication, the MKA process may begin with the peer-to-peer devices selecting a key server. In the illustrated embodiment, the switch 80 may be selected as the key server (arrow 262). The process may continue with the key server generating secure association keys (SAKs), which may refer to a random value that is generated based on the CAK. The key server may then communicate the SAK to any of the peer connected devices on the communication network 120 (e.g., IEDs 50, 52, and 54), thereby establishing a CA between the switch 80 and the IED 50 (arrow 264).

The switch 80 and the IED 50 may then exchange power system data via MACsec frames (arrow 266). The switch 80 and the IED 50 may further continue to send keep alive signals indicating that the CA is still alive (arrow 268). The MKA may be repeated for each of the application protocols that are used to communicate between the switch 80 and the IED 50.

One technique that may be used to determine which application protocols are enabled on a particular IED may be to inspect the IED. For example, an operator may provide inputs, at the IED, to cause the IED to display the enabled protocols of the IED However, such a process may involve instrumenting the device, which may be time consuming or difficult depending on the particular implementation.

Another technique may be used in which the IED 50 provides a set of enabled application protocols on the IED 50 upon establishing a connection with the switch 80. For example, the IED 50 may send one or more tag-length-value (TLV) frames indicating the application protocols enabled on the IED 50 during the MKA process (arrow 270). Additionally and/or alternatively, the IED may send an individual MKA CA for each application protocol enabled on the IED 50 (arrow 272). During the MKA process, IEDs 50, 52, and 54 may automatically send one or more tag-length-value (TLV) frames or MKA frames with a proprietary parameter set value that indicate the application protocols that are enabled on the IED 50, 52, and 54 upon establishing communication with the switch 80 (arrow 270). In some embodiments, the tag field may indicate that the value field includes a set of protocols and the length field may indicate the length of the value field.

Figure 7:
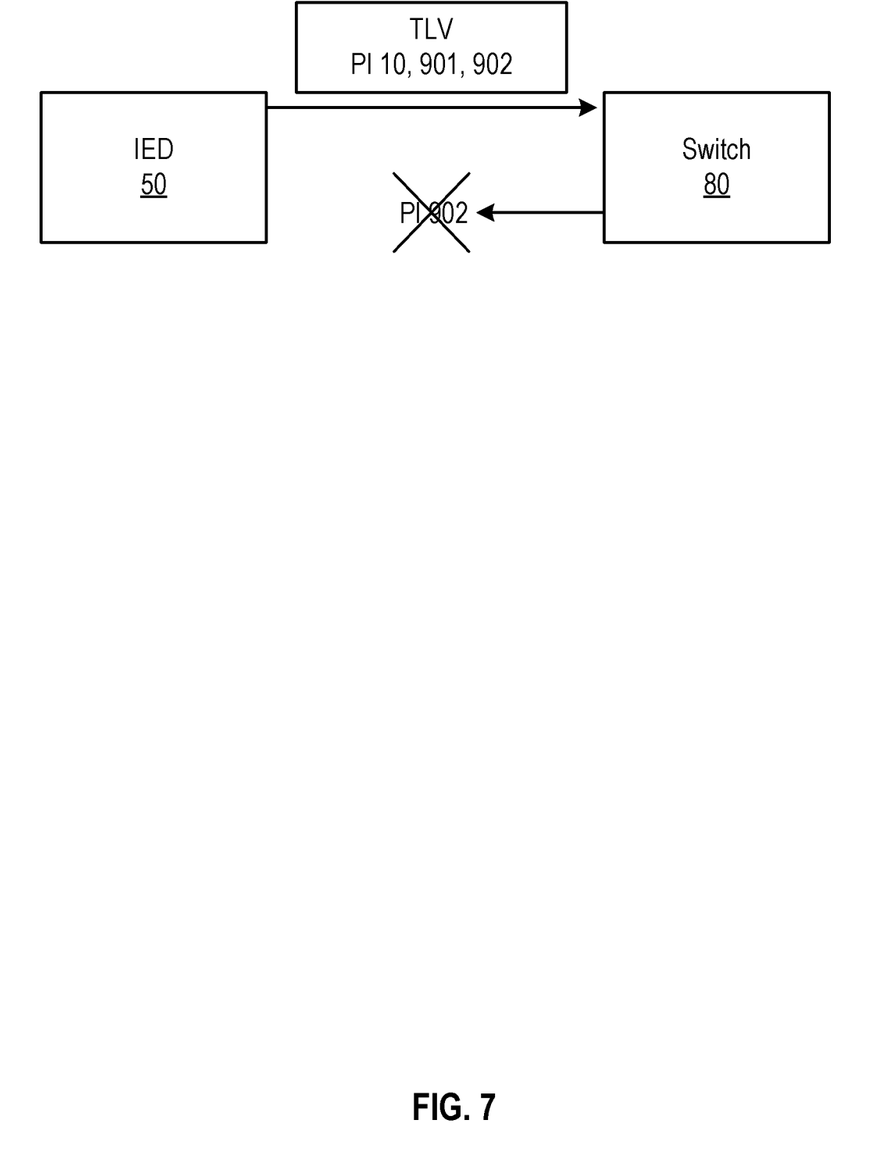
FIG. 7 is a timing diagram in which an application protocol is blocked on the communication network of FIG. 1, in accordance with an embodiment.

FIG. 7 is a block diagram of communication between the IED 50 and the switch 80. Upon establishing communication, the IED 50 may automatically send a TLV frame indicating the PIs of enabled application protocols to allow the switch 80 to acknowledge the enabled application protocols on the IED 50 and the communication network 120 without instrumenting the IED 50 (e.g., putting inputs in the IED 50 to request the enabled protocols).

After adoption where the IED 50 is accepted onto the MKA connectivity association and hence onto the communication network 120, IED 50 may continue to announce the enabled ports, protocols, and/or services at periodic intervals. Further, the switch 80 and the IED 50 may form a separate device management CA that is used to communicate management data over the communication network 120. The announcements may be encrypted with a key-encrypting key (KEK) derived from a CAK, which may be shared with each of the devices to facilitate management of the communication network 120.

Each of the application protocols may be associated with a unique MKA CA. Upon using the MKA process to establish a CA for each of the application protocols, the IED 50 may continue to periodically announce the enabled PI over the associated CA. For example, IED 50 may have a CA for PI 901 and periodically announce, over the CA, that PI 901 is enabled.

The switch 80 may receive inputs from an operator indicating settings of allowed application protocols on the communication network 120. As illustrated, the switch 80 may receive the CA indicating an application protocol is enabled on the IED or a TLV indicating the set of protocols enabled on the IED The switch 80 may determine that an application protocol that is enabled on the IED is not allowed on the communication network 120 based on the settings of the allowed application protocols.

In some embodiments, the switch 80 may provide a message to the IED 50 indicating that the application protocol (e.g., application protocol of PI 902 as illustrated) is disabled on the communication network. If no CAs are created for the Telnet application protocol and the IED 50 has Telnet as an enabled protocol, for example, then Telnet connections may not be created with the Telnet service due to the switch 80 blocking any CAs for Telnet. In certain embodiments, the switch 80 may inspect the PI of the MACsec frame sent by the IED 50 and allow or block the MACsec frame from traversing the communication network 120 based on the PI, thereby silently blocking offending communications without signaling any of the other IEDs.

In other embodiments, the switch 80 may block any communication from the IED 50 over the communication network 120 when the IED 50 attempts to use a blocked application protocol. If applications are blocked from being associated with a unique MKA CA, the switch 80 may block the IED 50 during adoption or after the receipt of a periodic MKA TLV.

MACsec may facilitate identification of an application used by the IED 50 communicating on the communication network 120 through the use of separate CAs per application. In some embodiments, each application is differentiated through the use of the PI. In such cases, each application may have a different PI, and thus a different transmit secure channel identifier, on the same CA. Software defined networking (SDN) may be used in which flows, matches, and actions are defined by an SDN controller. For example, SDNs may use the network and transport headers of frames to discern the application a device is attempting to communicate. By specifying application protocols in the PI field, the SDN controller may set flows, matches, and actions on the SDN switch with rules to facilitate communication between devices.

Figure 8:
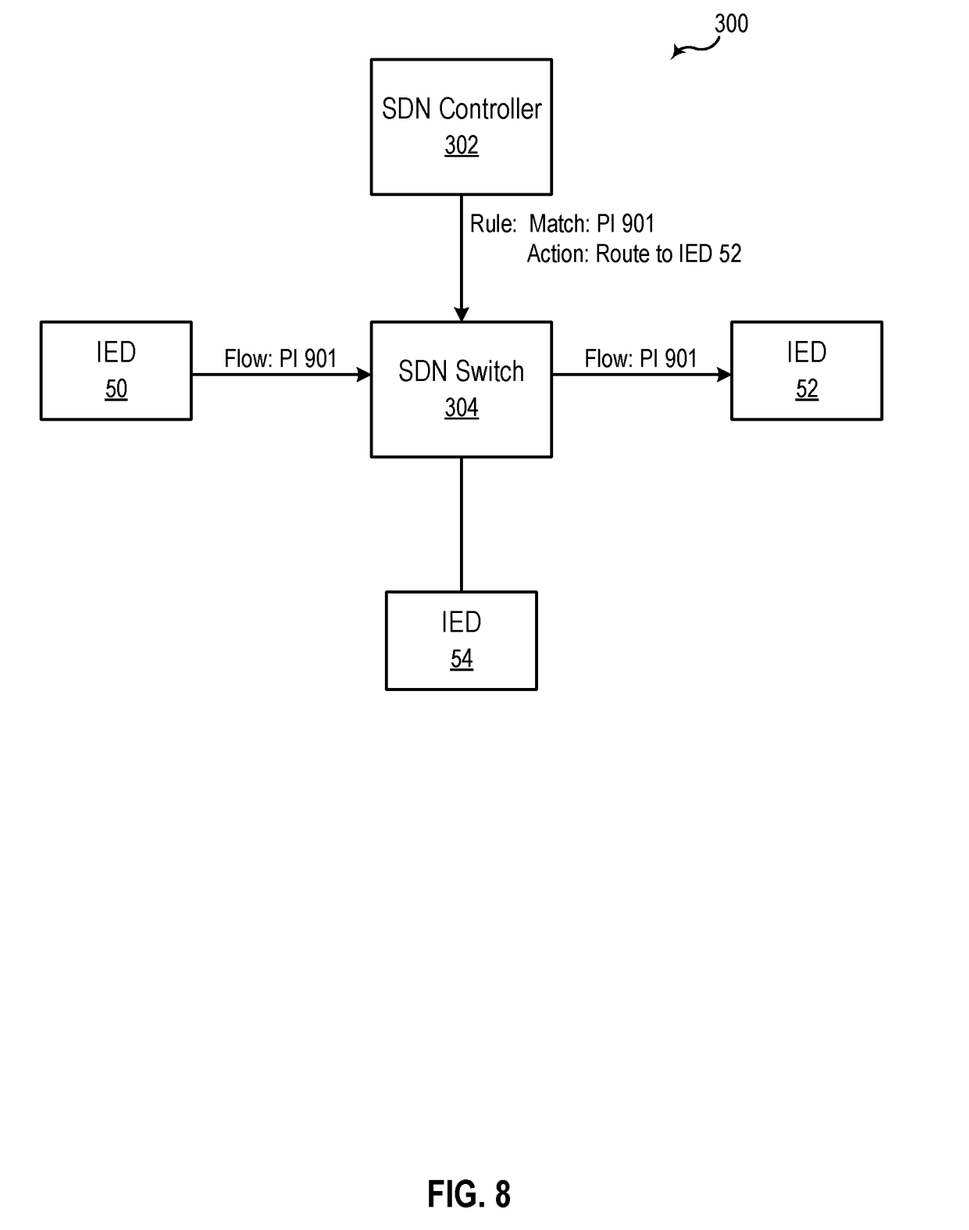
FIG. 8 is a network diagram of an SDN network that may be implemented on the communication network of FIG. 1, in accordance with an embodiment.

FIG. 8 is an embodiment of an SDN communication network 300 that may be implemented in the power system 20, in accordance with an embodiment. In the SDN communication network 300, an SDN controller 302 may control the communication across the communication network 300 using a programmable network architecture in which the physical network control plane is separated from the programmable forwarding plane. The SDN controller 302 may send one or more rules to the SDN switch 304. Further, the rules may include flows, matches, and actions of MACsec frames based on the PI.

As an example, the SDN controller 302 may send a rule, on the control plane, indicating that if the SDN switch 304 matches a received PI of 901 from IED 50 to a set PI of 901, the SDN switch 304 may perform the action of forwarding or routing the MACsec frame to IED 52. The SDN switch 304 may then, on the data plane, receive a MACsec frame with a PI of 901, match the PI of 901 to the set PI of 901, and proceed with the action of routing MACsec frame to IED 52 based on the matching of the PI 901 in the MACsec frame with the PI in the rule. The rule specifying the PI of 901 may be included with other rules, including MAC destination header, MAC source header, and Ethertype, among others. By setting flows, matches, and actions based in part on PI, the SDN switch 304 may securely control flows of encrypted communication based on the application protocol without decrypting the power system data itself. That is, the SDN switch 304 may inspect the OSI layer two header of the MACsec frame to detect the SDN flow match.

The rules may be created by an operator providing inputs to the SDN controller 302. In other embodiments, the rules may be automatically generated based on the connection associations on the communication network. For example, a GOOSE subscriber, such as IED 52, may remain silent on the communication network for a period of time. Using the previously formed connectivity association between the SDN switch 304 and the GOOSE subscriber 52, the SDN controller 302 may automatically generate a rule to route GOOSE messages to subscriber 52, for example, upon commissioning of a GOOSE publisher (e.g., IED 50). The SDN controller 302 may use the association between the GOOSE application protocol and the PI to generate the rule.

Figure 9:
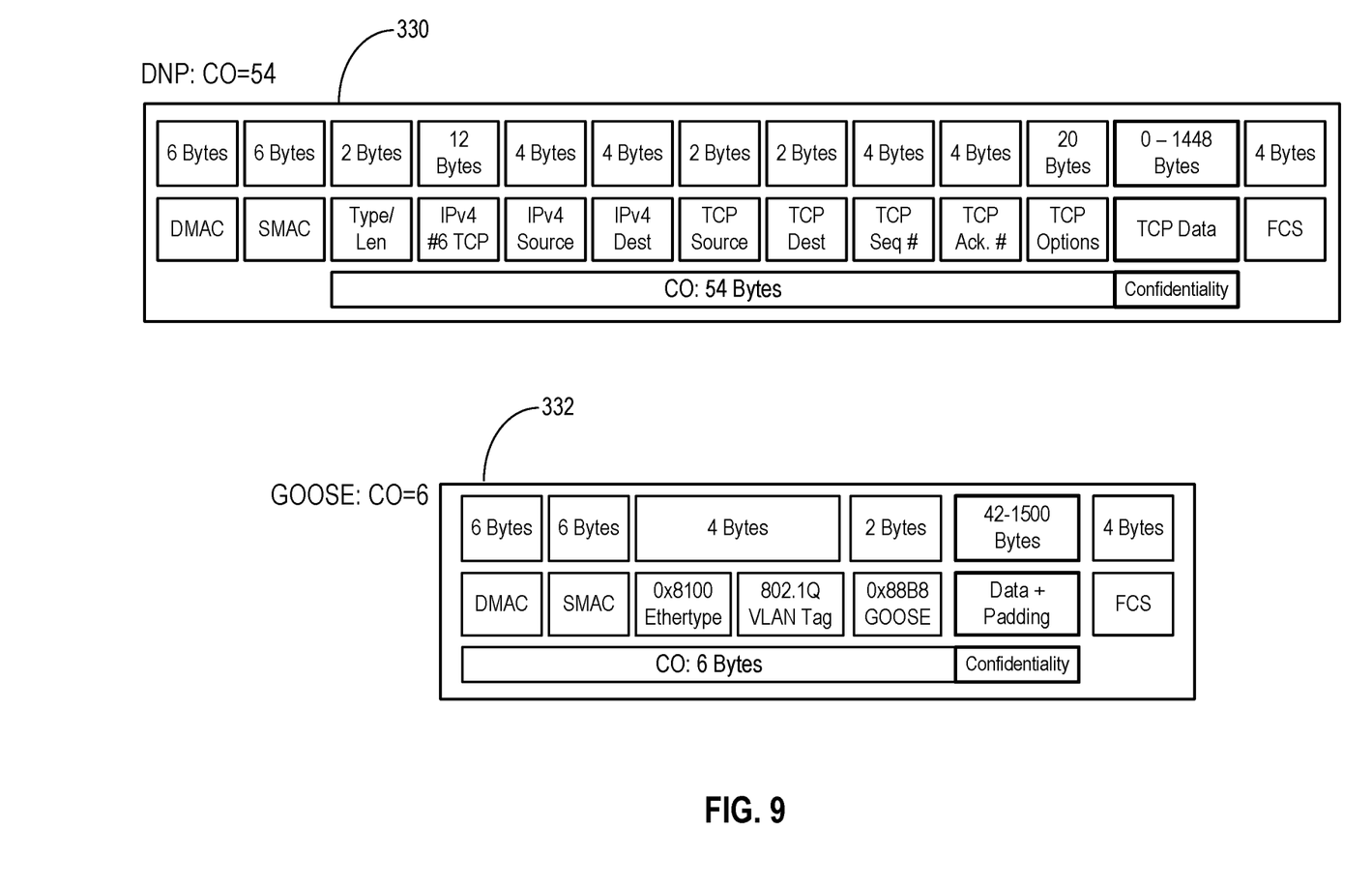
FIG. 9 is a layout of MACsec frames that may be communicated over the communication network of FIG. 1, in accordance with an embodiment.

FIG. 9 is an embodiment of a DNP frame 330 and a GOOSE frame 332 that may be sent from an IED to another IED in the power system 20. Frames of each of the application protocols may be associated with a confidentiality offset that indicates a point in a frame in which the payload has confidential data. For example, MACsec frames of any type may include destination and source mac address. Further, DNP application protocol frames may include metadata of the power system data that may be unencrypted or allowed to be accessed by intermediate devices (e.g., switch 80). For example, MACsec frames of the DNP application protocol may include a type/len field, IPv4 field, IPv4 source field, IPv4 destination field, TCP Source field, TCP destination field, TCP sequence number, TCP acknowledgement number, and a TCP options field. Following the TCP options field, the MACsec frame may include TCP data that is confidential and may be encrypted. Conversely, MACsec frames of the GOOSE protocol may include destination and source mac addresses, an Ethertype field, a VLAN tag, and a GOOSE field indicating that the MACsec frame is a GOOSE message. Following the GOOSE field, the MACsec frame may include data and padding that may be confidential and encrypted. The confidential and encrypted data of the DNP protocol frame 330 and the GOOSE protocol MACsec frame 332 begin at different bits in the MACsec frame.

The key server, such as the switch 80, may generate and distribute a confidentiality offset during the MKA process 260 in FIG. 6. For example, when generating the SAK (arrow 264 of FIG. 6), the switch 80 may use a look-up table to determine a confidentiality offset associated with the application protocol of the MKA process. The switch 80 may distribute the confidentiality offset value of the application protocol with the SAK to the receiving device. For instance, if the switch 80 were performing the MKA process to establish a CA with an IED using a DNP application protocol, the switch 80 may send a confidentiality offset of 54 bytes. Further, if the switch 80 were performing the MKA process to establish a CA with an IED using the GOOSE application protocol, the switch 80 may send a confidentiality offset of 6 bytes. The confidentiality offset may be used by the IDS to inspect packet headers while blocking the application data from being viewed (e.g., TCP data).

The switch 80 may communicate an MKA announce message or an MKA message with a proprietary parameter set following the SAK distribution indicating the offset (e.g., as part of a protocol TLV or CA message). For example, an MKA-announce message may indicate "offset=0" which may set the encryption mode to 0 in which the original frame payload is encrypted when the MACsec Sectag 146 indicates that encryption is to be used.

That is, following communication of the confidentiality offset, during communication of a MACsec frame of power system data, the IED may inspect the PI to determine the application protocol of the MACsec frame. The IED may then inspect the headers of the application protocol based on the confidentiality offset. For instance, the IED may receive a confidentiality offset of 54 bytes for a DNP message. Because the IPv4 source and destination are not confidential (e.g., unencrypted) due to the 54 byte offset, the IED may inspect the IPv4 source and destination. The IED may then perform control actions based on the power system data that is not confidential, such as discarding information from a particular IPv4 address.

Upon establishing communication and determining that the application protocol is allowed, the IED 50 may then send MACsec frames that use the PI to indicate the application protocol of the MACsec frame. The switch 80 may inspect and allow MACsec frames with the allowed application protocol to be forwarded to the receiving IED 52 and 54. Further, when the switch 80 distributes the SAK, the switch 80 may include a confidentiality offset (CO) associated with the SAK.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED), comprising:
a memory; and
a processor operatively coupled to the memory, wherein the processor is configured to execute instructions stored on the memory to cause operations comprising:
receive from a key server of a communication network, a secure association key (SAK) with a confidentiality offset associated with an application protocol;
generate a frame comprising a port identifier associated with the application protocol of a network stack of the communication network of a power system to allow a receiving device on the communication network to identify the application protocol of the frame using the port identifier;
wherein the frame includes an unencrypted portion and an encrypted portion based on the confidentiality offset; and
sending the frame to the receiving device.

2. The IED of claim 1, wherein the processor is configured to cause operations comprising selecting the port identifier associated with the application protocol from a lookup table of port identifiers on the network stack.

3. The IED of claim 2, wherein each application protocol in the lookup table has a different port identifier.

4. The IED of claim 1, wherein a protocol suite of the network stack comprises a set of application protocols associated with the same port identifier.

5. The IED of claim 1, wherein the instructions stored on the memory further cause operations comprising:
obtain power system data from a power system, the power system data comprises a voltage measurement, a current measurement, a circuit breaker status, a circuit breaker command, or any combination thereof.

6. The IED of claim 1, wherein the application protocol of the network stack comprises Distributed Network Protocol (DNP), Multimedia Messaging Services (MMS), Modbus, Transmission Control Protocol (TCP), Telnet, Generic Object-Oriented Substation Event (GOOSE), or any combination thereof.

7. The IED of claim 1, wherein the frame comprises an 802.1AE Institute of Electrical and Electronics Engineers (IEEE) Media Access Control Security (MACsec) frame.

8. The IED of claim 7, wherein the port identifier is inserted into a secure channel identifier of the MACsec frame to allow the receiving device to identify the application protocol of the frame without inspecting a payload of the frame.

9. The IED of claim 1, comprising:
receiving, from a key server of the communication network, a secure association key (SAK) with a confidentiality offset associated with the application protocol;
generating the frame having an unencrypted portion and an encrypted portion based on the confidentiality offset; and
sending the frame to the receiving device.

10. A method, comprising:
generating, via a key server, a secure association key (SAK);
distributing, via the key server, the SAK to the second electronic device;
generating, via the first electronic device, a frame comprising a port identifier associated with an application protocol of a communication network of the power system to allow a second electronic device to identify the application protocol of the frame; and sending a confidentiality offset of the port identifier to allow the second electronic device to perform a layer two inspection of the frame without decrypting the frame.

11. The method of claim 10, comprising:
receiving, at the second electronic device, the frame sent from the first electronic device; and
associating, via the second electronic device, the frame with the application protocol based on the port identifier.

12. The method of claim 10, comprising:
selecting, via the first electronic device, the port identifier of the application protocol from a look-up table of port identifiers.

13. The method of claim 12, wherein the look-up table comprises a first potential application protocol associated with a first potential port identifier value and a second potential application protocol associated with a second potential port identifier value.

14. The method of claim 10, wherein the application protocol of the network stack comprises Distributed Network Protocol (DNP), Multimedia Messaging Services (MMS), Modbus, Transmission Control Protocol (TCP), Telnet, Generic Object-Oriented Substation Event (GOOSE), or any combination thereof.

15. An intelligent electronic device (IED), comprising:
a memory; and
a processor operatively coupled to the memory, wherein the processor is configured to execute instructions stored on the memory to cause operations comprising:
receive, from a key server of the communication network, a secure association key (SAK) with a confidentiality offset associates with the application protocol;
generate a frame comprising:
an unencrypted portion and an encrypted portion based on the confidentiality offset, and
a port identifier associated with an application protocol of a network stack of a communication network of the power system to allow a receiving device on the communication network to identify the application protocol of the frame; and
send the frame to the receiving device.

* * * * *